United States Patent Office 3,782,969
Patented Jan. 1, 1974

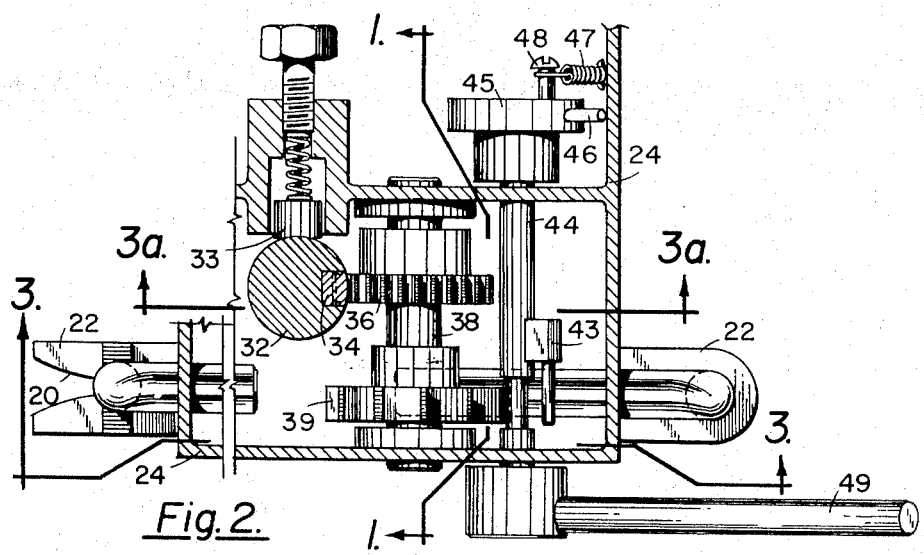
Fig. 2.
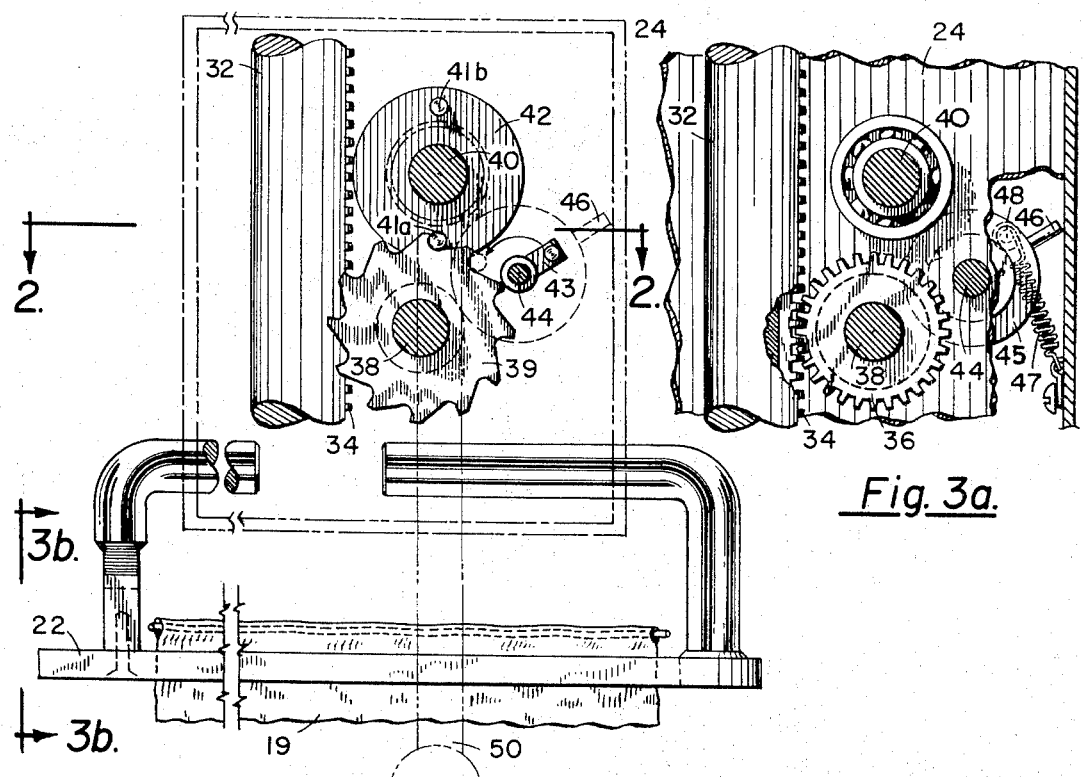
Fig. 3.
Fig. 3a.
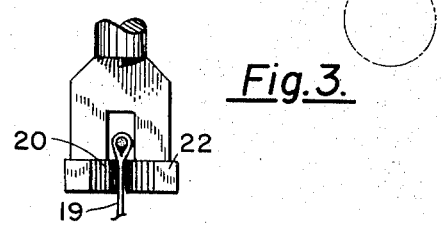
Fig. 3b.

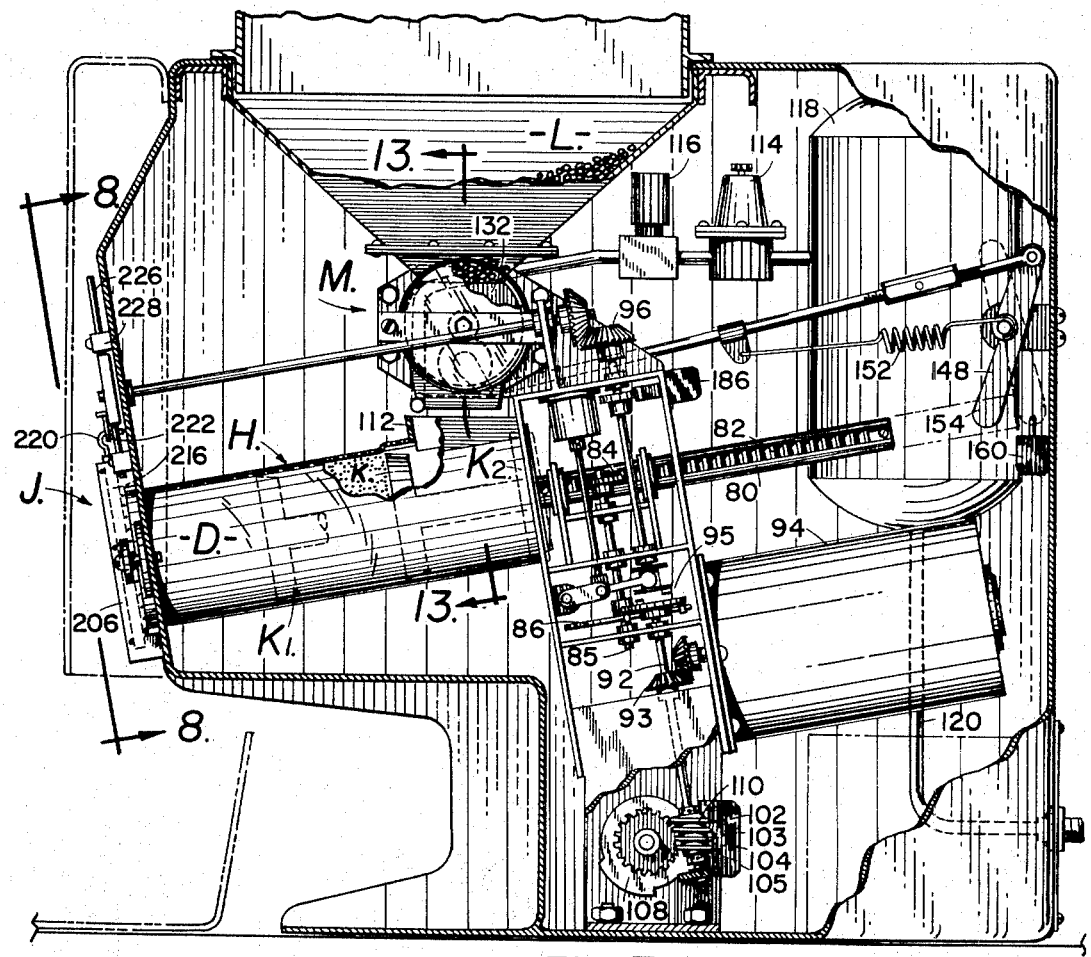
Fig. 7.
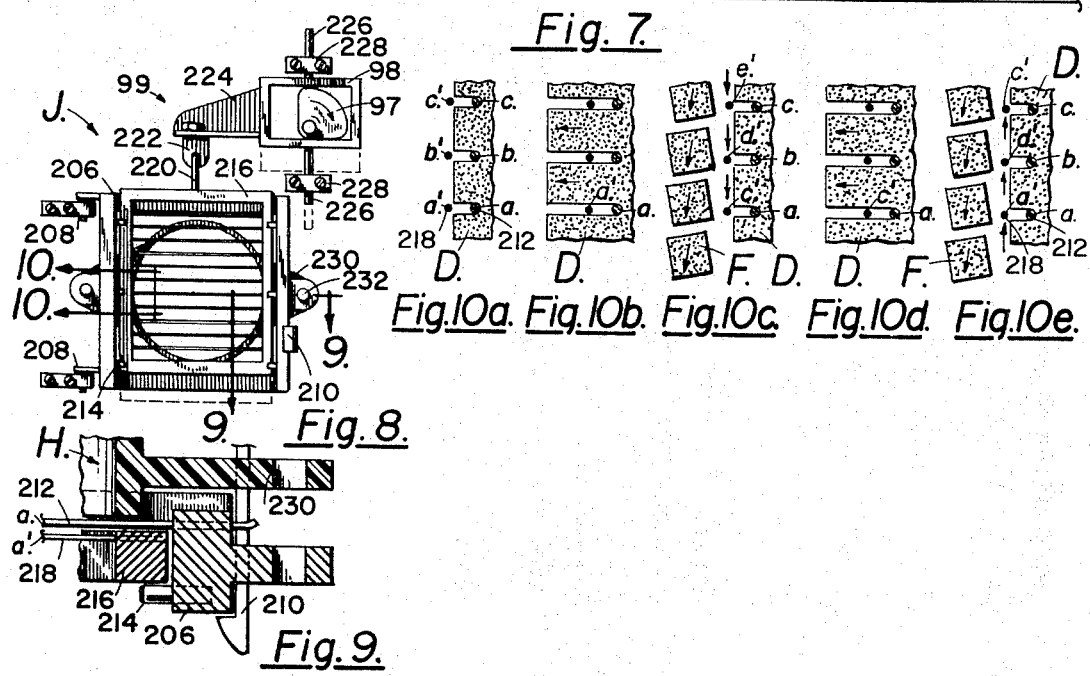
Fig.10a. Fig.10b. Fig.10c. Fig.10d. Fig.10e.
Fig. 8.
Fig. 9.

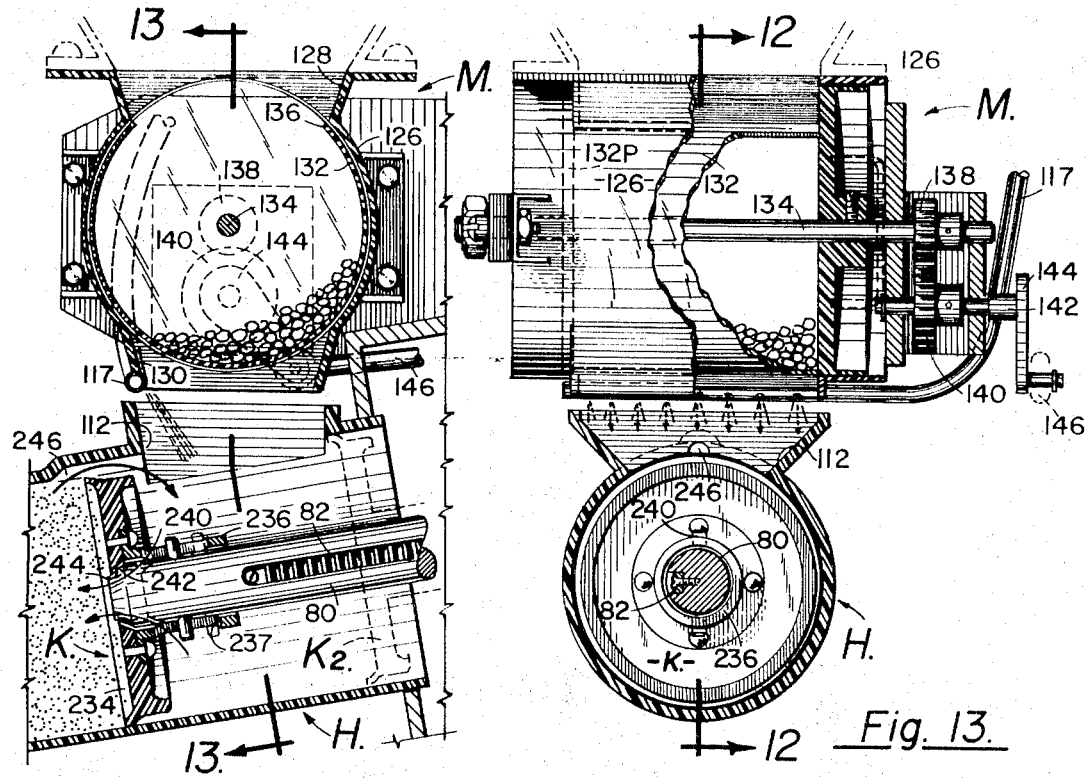
Fig. 12.
Fig. 13.
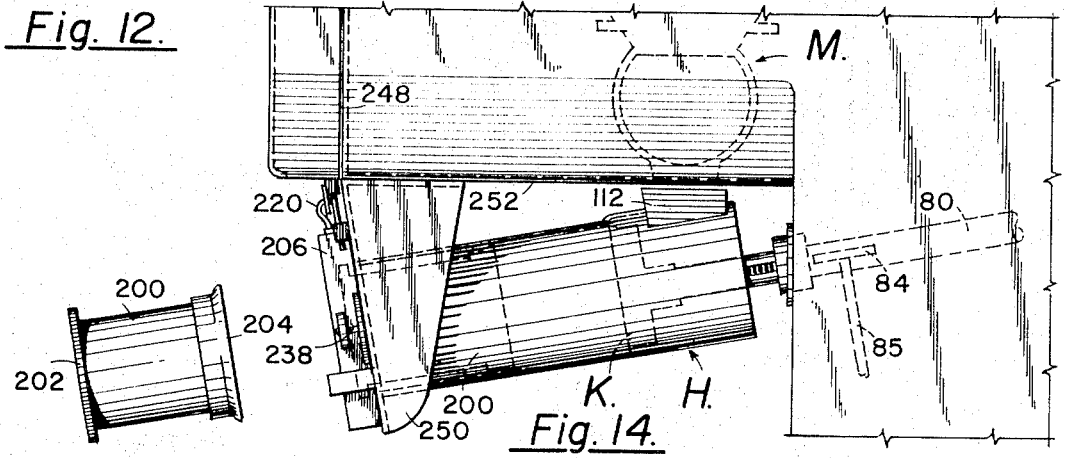
Fig. 14.
Fig. 15.
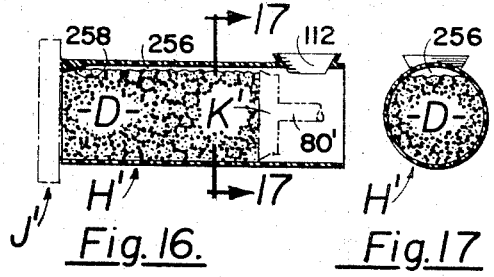
Fig. 16.
Fig. 17.

3,782,969
FRENCH FRY CUT POTATO DOUGH PIECE
Roderick G. Beck, James F. Harmon, and Mounir A. Shatila, Blackfoot, Idaho, David A. Richins, Bountiful, Utah, and John H. Lach, Blackfoot, Idaho, assignors to American Potato Company, San Francisco, Calif.
Original application Apr. 16, 1969, Ser. No. 816,675, now Patent No. 3,605,647. Divided and this application Sept. 4, 1970, Ser. No. 69,885
Int. Cl. A23l 1/12
U.S. Cl. 426—145               3 Claims

ABSTRACT OF THE DISCLOSURE

A machine for forming from potato dough elongate bodies that resemble potato pieces suitable for french frying. The machine is arranged to move the dough through spaces between a set of parallel wires, which wires are spaced from one another by amount corresponding to the width of the piece. The length of the spaces determines the length of the potato piece. A second set of parallel wires is supported in registry with the first mentioned set during dough movement; after the dough is moved by an amount corresponding to the thickness of a french fry body, the wires of the second set are moved across the dough to separate potato pieces suitable for french frying. A machine for automatically synchronizing the movement of the dough and the movement of the second set of wires. A french fry potato piece formed by the apparatus which piece is characterized by an uncompressed surface.

This patent application is a divisional application of patent application Ser. No. 816,675, filed Apr. 16, 1969, Pat. No. 3,605,647 entitled "French Fry Potato Bodies and Method and Apparatus for Forming Such Bodies."

This invention relates to a machine for reconstituting agglomerates of potato particles into a homogeneous dough and for dividing or separating the potato dough into pieces having the shape of french-fry-cut potato pieces, which pieces have novel characteristics and can be deep fat fried. As used herein the term "french-fry-cut potato pieces" denotes an elongate body having an approximately square cross-section. French-fry-cut potato pieces produced according to the present invention can be deep fat fried at a temperature of about 370° F. for about 1½–2 minutes or refrigerated or frozen for later frying.

Disclosed in a copending commonly assigned application for U.S. Letters Patent, S.N. 814,519, now U.S. Letters Patent No. 3,622,355 is a dry product and a process for making a product that can be reconstituted without mixing or agitation to form a uniform dough. French-fry-cut potato pieces can be formed from such dough by employing apparatus of the present invention. Such copending application discloses how the product described therein eliminates many problems encountered in connection with previously known doughs made primarily from potato solids and water.

The known prior art includes machines that are capable of forming dough into potato pieces suitable for french frying. In this respect are cited U.S. Pat. Nos. 3,215,094 and 3,344,752, each of which discloses apparatus that includes a die plate that has openings corresponding to the cross sectional dimension of a French-fry-cut potato piece. In order to extrude the dough through the die openings, substantial pressure on the dough is necessary. French-fry-cut potato pieces formed under substantial pressure have a glazed or trowelled surface texture, and after frying, a puffed, unnatural appearance, and an excessive oil content. Other shortcomings include distorted shape and separation of the shell of the fried potato body from the interior thereof.

A machine, according to the present invention, avoids the above-enumerated disadvantages and shortcomings in the prior art by forming French-fry-cut potato pieces from potato dough at a very low pressure. Extensive tests have shown that most of the above-mentioned undesirable characteristics are caused by the combined effects of compressing the dough to high pressures necessary to extrude the dough through the restrictive die openings and subjecting the dough to the trowelling or glazing action from the edge portions or surfaces of the die plate that define the die openings.

Pressure on the dough during formation of French-fry-cut potato bodies is inversely proportional to the amount of open area relative to the closed area through which a dough mass is moved. Extrusion plates, as well as wire grids, were investigated to determine the effect of pressure on the quality of the finished French-fry-cut potato bodies. In order to determine the effect of open area in the extrusion plate and the pressures generated by extrusion under different conditions, a test extruder was constructed. For open areas of 75% and below, evenly spaced slots 4" long x 5/16" were formed in a 0.090-inch aluminum plate. Open area of 85% was achieved by the use of 0.062" parallelly-spaced wires, and 89.5% was achieved by the use of 0.042" wires as a forming die. Cutting was done with a 0.015" wire. The extruder was placed under the plunger of a commercial potato dough extruder. Pressure was measured by attaching a spring scale to the end of the handle and applying pressure until the dough started to move through the openings in the die. The force at the output of the unit was calculated by multiplying this force by the mechanical advantage. This figure was converted to pressure in pounds per square inch at the output of the unit. The pieces formed under each set of conditions were deep fat fried and analyzed and appropriate data were recorded. These data showed that blistering during frying decreases as percent of open area in the extrusion die increases. All samples formed through a die plate with more than about 40% open area had little blistering. Pressure was found to be proportional to percent open area, and all samples formed at pressures below about 2.2 pounds per square inch had very little blistering or leatheriness. Blistering was confined to the extruded sides and when all cutting was done by wires, at 85% or above open area, no blistering was found. All samples formed through dies of more than 60% open area showed no leatheriness; whereas products formed through dies with less than 60% open area became more dry and leathery as percent open area decreased. It is theorized that the surfaces are probably subjected to pressures about 60 p.s.i. since that had been determined to produce leatheriness, although no means of objectively measuring this pressure is presently known. When a plate of only 8% open area was used, the dough pressure was 3.34 pounds per square inch and the finished French fries were blistered on the extruded sides and were very dry and leathery. The poor results were probably due to pressure in excess of 2 p.s.i. and the trowelling effect of the die plate.

Oil content of the cooked French-fry potato bodies decreased as pressures increased. At relatively high pressures, the finished fries were dry and leathery and had an oil content of only 6.3%, whereas the fries formed at pressures below 2.2 pounds per square inch (corresponding open die areas greater than 60%) had desirable oil content of about 12–17%.

Similar data and products were obtained using the same dough in three commercial potato dough extruding machines now in widespread use. The data are tabulated below:

| Machine identification | A | B | C |
| --- | --- | --- | --- |
| Open area in extrusion plate, percent | 9.5 | 8.25 | 9.1 |
| Pressure on dough, p.s.i. | 5.1 | 5.87 | 15.2 |
| Extrusion plate thickness, inches | 0.5 | 0.625 | 0.625 |

All products extruded from the above machines were blistered on the four large sides. Blistering was much worse than any experienced in the previously described test unit at the maximum pressure of 3.34 pounds per square inch.

From the above data, it was concluded that it would be necessary to depart radically from prior art potato dough extruding machine design if we were to develop a machine capable of forming dough pieces which could be deep fat fried to form French fries with natural appearance and freedom from leatheriness and other deficiencies. The results of this research are the machines described herein.

According to the present invention, a mass of potato dough is caused to approach a plurality of parallelly spaced wires, which wires have a diameter that is very small as compared to the space between adjacent wires. Accordingly, the resistance afforded by the wires to movement of the dough is such that the dough is subjected to extremely low pressure of the order of about 2 p.s.i. in moving the dough through the spaces between the wires. It is thus the principal object of the present invention to provide a French-fry-cut potato-forming apparatus that subjects the dough to a very low pressure. The object is achieved by providing a first set of parallel spaced apart wires and moving the dough through the set. As the dough egresses from the output side of such set, the protruding portion thereof is transversely separated by a second set of parallelly spaced wires which are equal to the spacing of the wires in the first plurality. Movement of the dough can be interrupted during separation of the dough by the second set of wires so that application of force and pressure to the dough is intermittent.

Another aspect contributing to formation of unsatisfactory French-fry potato bodies is the formation of a glaze on the edges of the bodies; when the bodies are deep fried, a relatively hard shell is formed which separates from the interior of the body. Tests have shown that a substantial surface on the side of the die openings in an extruder, i.e., a surface oriented parallel to the direction of movement of material through the die, has a smoothing or trowelling effect on the surface of the body. The present invention totally avoids this because the wires used for cutting the dough have an insignificant dimension in the direction of material movement.

It is believed that the movement of the potato dough through spaces between wires does not actually cut or sever any of the individual potato particles or cells; it merely pushes the cells aside. This mode of operation follows from the presence of low pressure in the dough and is believed to account for the improved surface texture of French-fry bodies formed according to the present invention.

Another object is to provide a potato reconstituting system that requires no mixing or agitation. This object is achieved in a first embodiment of the invention by providing a closed chamber that has a variable volume so that when a predetermined amount of water is added to the potato product in the chamber, the volume of the chamber is reduced to consolidate the contents so as to permit the water to disperse uniformly throughout the dry product, thereby to effect reconstitution of the product and complete filling of the chamber with dough regardless of the position of the cylinder. With the chamber disposed in a vertical position, the volume of the chamber need not be reduced to assure a uniform layer in the chamber since gravitational force accomplishes consolidation of the contents. Since, for reasons which will be stated later, we prefer to practice the invention by operating the chamber at an angle to the vertical, i.e., horizontal or nearly horizontal, the variable volume feature is desirable. Attainment of this object affords rapid production of a uniform or homogeneous dough.

Still another object of the present invention is to provide an apparatus of the class described that is capable of operation by persons of only moderate skill.

A manually operated embodiment of the invention is adapted to reconstitute and operate upon dough packaged in a flexible container of a given uniform size. This apparatus is adapted so that the flexible container can be readily inserted into the apparatus without handling the dough and without necessity for any precise adjustments. In the automatic embodiment of the invention, the requisite amounts of dry product and water are automatically metered into a chamber and the volume of such chamber is automatically reduced to afford optimum conditions for reconstitution of the dry product. Interlocks are provided so that only after the dough is ready for extrusion can formation of French-fry-cut potato bodies be effected.

Yet another object of the present invention is to provide a novel method for forming French-fry-cut potato bodies, which method includes the steps of providing a homogeneous body of potato dough, providing a plurality of parallelly-spaced wires, advancing the dough through the wires, and cutting the dough along the lines that are parallel to the wires.

A further object of the present invention is to provide a French-fry potato-piece that is formed from reconstituted agglomerates of potato particles and that has an uncompacted surface. Potato bodies of the present invention contrast with potato bodies formed by prior art extrusion methods in that extruded bodies have a compacted, dense surface that is smooth and relatively impervious to internal steam formed during frying and to grease.

A factor present in the instant invention that contributes to formation of a body of substantially uniform density is that the bodies are formed at an extremely low pressure. Formation of the bodies at an extremely low pressure is made possible because the plurality of spaced extremely thin wires affords virtually no impediment or resistance to advancing movement of the potato dough therethrough. A die plate, such as is disclosed in the prior art, not only has a relatively small open area but frequently has a substantial surface oriented in a direction along which the potato bodies are moved as the dough is being extruded. The wires of the present invention, by way of contrast, do not form a compacted or high density surface layer on the French-fry-cut potato bodies.

A still further object of the present invention is to provide a dough-cutting apparatus that cuts the dough into the shape of French-fried potato bodies without compacting the dough at the surface thereof. This object is achieved by employing a plurality of spaced-apart wires, as the cutting members, and advancing the dough through the wires. The advance is effected in a periodic, interrupted fashion so that the dough is moved forward through the wires, then stopped, and then again moved forward. During the time that the dough is stopped, a second set of wires normally residing in registry with the first-mentioned set are moved transversely to sever the protruding strips of dough into finally-formed French-fry-cut potato bodies.

Other objects, features and advantages of the present invention will be more apparent after referring to the following specification and accompanying drawings in which:

FIG. 2 is a cross-sectional view taken along line 2—2 of FIG. 1 and rotated 90°;

FIG. 3 is a cross-sectional view taken along line 3—3 of FIG. 1;

FIG. 3a is a cross-sectional view taken along line 3a—3a of FIG. 2;

FIG. 3b is a sectional view taken along line 3b—3b of FIG. 3;

FIG. 7 is an elevation view in partial cross-section of an automatic machine that embodies the present invention;

FIG. 8 is a view taken along line 8—8 of FIG. 7;

FIG. 9 is a fragmentary view taken along line 9—9 of FIG. 8;

FIGS. 10a–10e are views of the sequence of operation of wire-cutting members, the views being taken generally along line 10—10 of FIG. 8;

FIG. 12 is a view and enlarged scale of a portion of FIG. 7 showing the dry product metering apparatus, such figure being taken along line 12—12 of FIG. 13;

FIG. 13 is a view taken 90 degrees from FIG. 12 along line 13—13 of FIG. 12;

FIG. 14 is an elevational view of a machine similar to that shown in FIG. 7 but embodying certain structural modifications;

FIG. 15 is a view of a water-tight plug for temporarily closing the dough chamber during start-up;

FIG. 16 is a partially schematic diagram of a modified form of mixing chamber embodying the invention; and FIG. 17 is a cross-sectional view taken along line 17—17 of FIG. 16.

Figure 1:
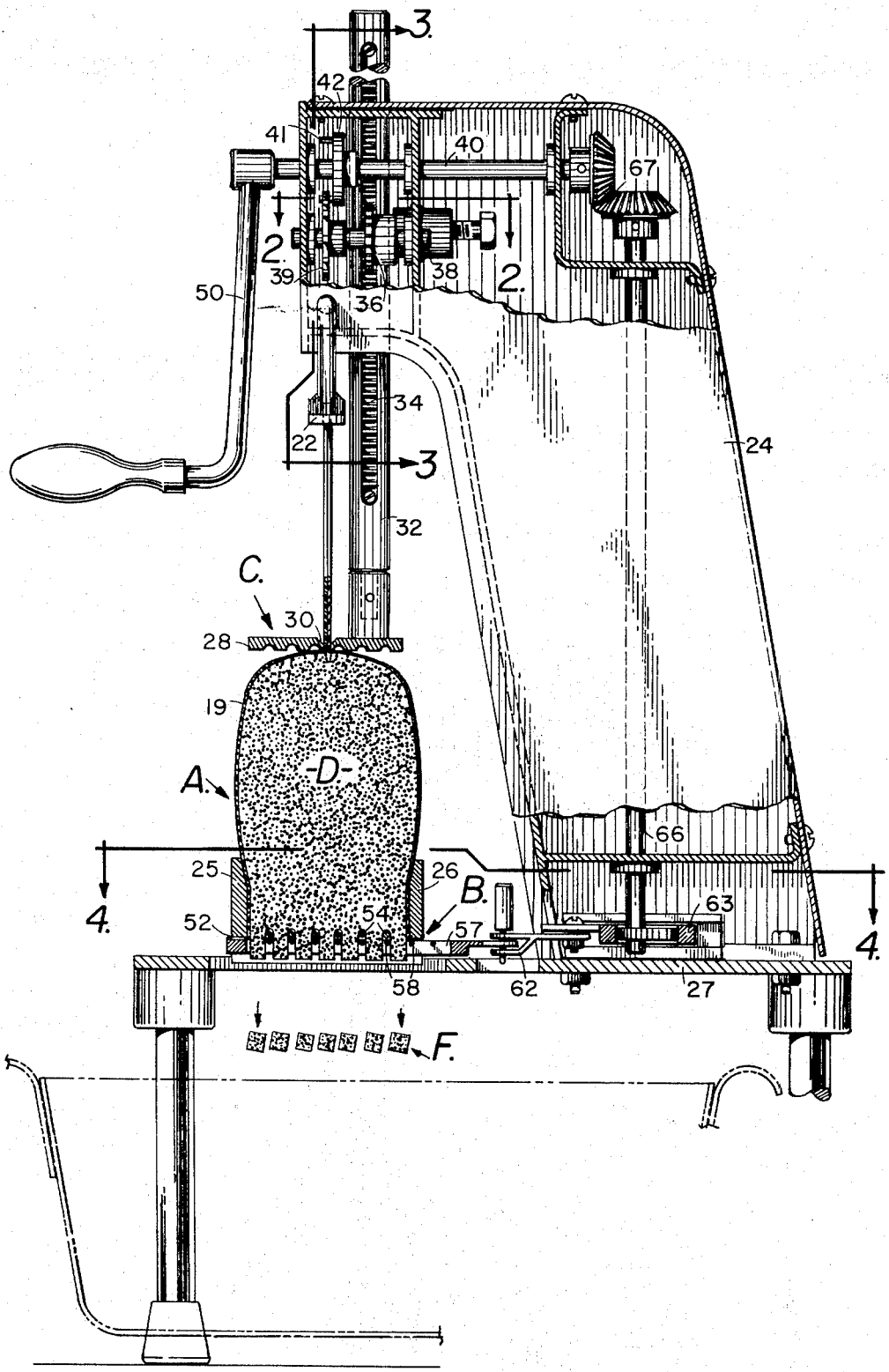
FIG. 1 is an elevational view in partial cross-section showing a manually operated machine embodying the present invention.

Referring more particularly to the manually operated embodiment of the invention shown in FIGS. 1–6, a dough containing chamber A has adjacent the outlet opening thereof a dough-cutting mechanism B. Dough in the chamber is urged toward the cutting mechanism by a plunger or like pushing structure C. In the embodiment of the invention shown in FIG. 1, the chamber A is formed from a flexible water-proof bag 19 made of polyethylene or the like. The bag during shipment and prior to placement on the apparatus contains dry, reconstitutable material, such as that described in U.S. Pat. No. 3,622,355 which by addition of water, forms a potato dough D suitable for formation into French-fry-cut potato bodies. When reconstitution has been effected, the bag is inverted to the position shown in FIG. 1 and is retained at the upper extremity thereof in a slot 20 formed in a crossbar 22. Crossbar 22 is supported rigid with a main housing frame 24. The lower open end of bag 19 is retained in position by a front guide plate 25 and a rear guide plate 26 that are mounted rigid with housing 24 on a base plate 27; the pressure developed within the bag is so low that guide plates 25 and 26 suffice to retain the bag in alignment with cutting apparatus B.

Dough-pushing structure C includes a pressure plate 28 that is centrally slotted at 30 so that the portions of the plate adjacent to the slot slide along the outer surface of bag 19 and advance dough D in the bag downwardly. As seen most clearly in FIG. 1, the plate 28 is sized to fit between guide plates 25 and 26 so that in the lowermost position of the plate virtually all dough in chamber A is discharged. Plate 28 is supported on the lower end of a drive rod 32 that is slidably supported in suitable bushings in housing 24. A friction shoe 33 is spring biased into contact with the drive rod to stabilize the rod and prevent it from moving inadvertently. Longitudinally of drive rod 32 is secured a gear rack 34 with which is enmeshed a drive pinion 36. Pinion 36 is carried on an idler shaft 38 that is supported for rotation in housing 24.

Shaft 38 also carries a toothed wheel 39 which cooperates with pins 41a and 41b to form an intermittent drive train assembly. Pins 41a and 41b are mounted on a disc 42 that is carried on a shaft 40. Shaft 40 has at the outer end thereof a hand crank 50 to permit application of rotative motion to shaft 40. Rotation of shaft 40 through 180 degrees causes advancement of wheel 39 by one notch. Corresponding to such rotative advancement of wheel 39 is a finite downward movement of plunger 32. The amount of downward movement of the plunger, of course, depends upon the size of the gear teeth in rack 34 and pinion 36 as well as the size of the teeth in wheel 39 and the diameters of the various rotative parts. An example of a desired amount of downward movement of plunger 32 is 5/16 of an inch, the thickness dimension of a satisfactory French-fry-cut potato body. As will appear in more detail hereinafter, cutting mechanism B is activated during the time that plunger 32 and the dough that moves in response thereto is in a stationary or immobile position.

As plunger 32 is moved downwardly to advance dough D through the cutting mechanism B, a certain amount of back pressure in the dough is created which, if not compensated, would urge plunger 32 upwardly. To compensate for this tendency to upward movement, a ratchet pawl 43 is provided for engagement with the teeth on wheel 39. Pawl 43 is mounted on a pivot shaft 44 which is movable between a position as shown in FIG. 3 at which pawl 43 is out of engagement with tooth wheel 39, and a position rotatively spaced in a counterclockwise position from the position shown in FIG. 3, at which the pawl engages tooth wheel 39. Secured on the back end of shaft 44 is a collar 45 from which radially extends a pawl stop 46. The pawl stop contacts housing 24, as seen in FIG. 3, to limit rotative movement of the pawl. An over-center spring 47 is connected to an eccentric pin 48 on collar 45; the spring biases the pawl in either the open position or the engaged position. At the forward end of shaft 44, a pawl operating handle 49 is mounted; the handle is accessible to the operator so that the pawl can be engaged during downward movement of plunger 32 and disengaged so that the plunger can be raised.

Figure 4:
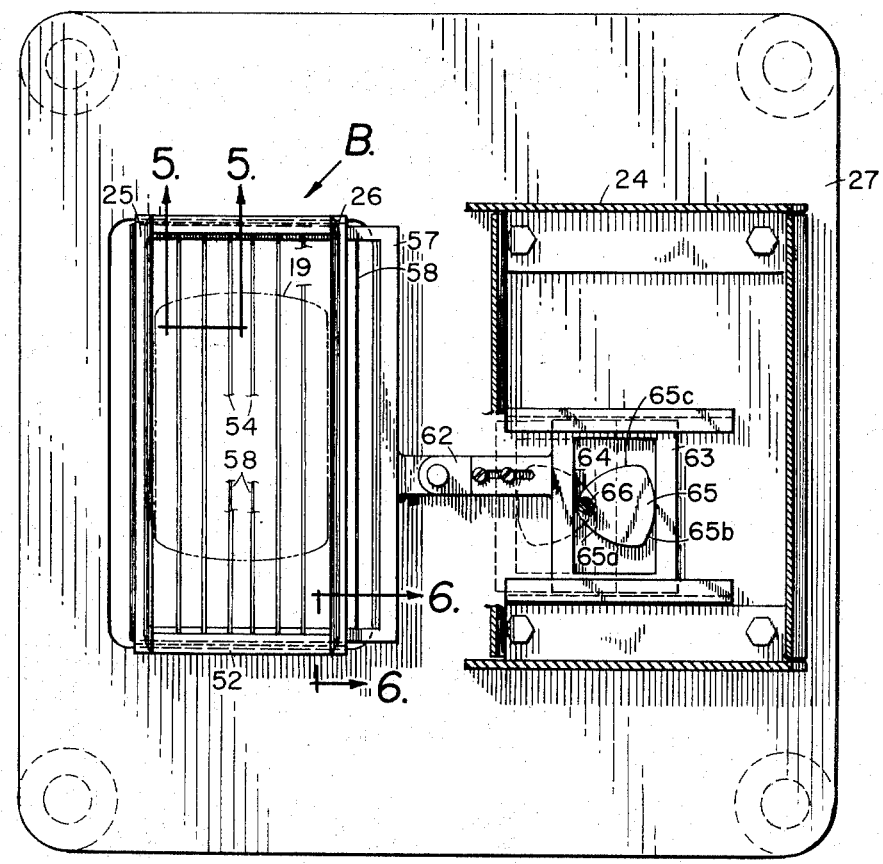
FIG. 4 is a cross-sectional view taken along line 4—4 of FIG. 1.
Figure 6:
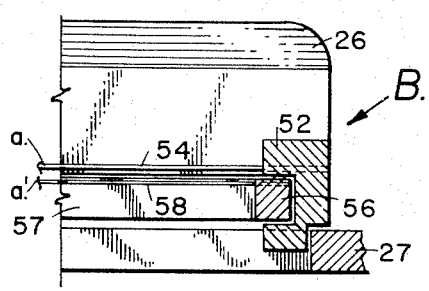
FIG. 6 is a view taken along line 6—6 of FIG. 4 showing a detailed view of the wire support system.

Dough-cutting assembly B includes a rectangular frame 52 disposed between front and rear guide plates 25 and 26 at the outlet end of dough chamber A. Spanning the side members of frame 52 is a set of parallelly-spaced wires 54 which are preferably uniformly spaced apart by an amount equal to the width of a French-fry potato body, e.g. 5/16 inch. FIG. 4 illustrates that the side members of frame 52 are spaced from one another by a distance at least as great as the width of bag 19, so that the length of the French-fry-cut potato body formed between adjacent wires is equal to the width of the bag. As seen in FIG. 6, the side members of frame 52 are slotted below wires 54 at 56; within slots 56 is supported a reciprocable cutter frame 57 that has a second set of parallelly-spaced wires 58 spanning the side members thereof. The center-to-center spacing between wires 58 is identical to the spacing of wires 54 so that frame 57 can be positioned such that each of the wires 58 lies in registry with one of wires 54. Wires 58 are preferably of a diameter smaller than wires 54 so that wires 58 reside totally beneath wires 54 and out of the path of dough advancement. The force to which wires 58 are subjected during operation of the apparatus is much less than the force to which wires 54 are subjected as a consequence of which a smaller diameter wire for wires 58 is adequate and is preferred.

Frame 57 and wires 58 are reciprocated transversely only during the time that downward motion of plunger 32 has been interrupted by the intermittent drive apparatus of which tooth wheel 39 is a part. For achieving such mode of operation, frame 57 is attached by means of a separable link 62 to a cam follower 63 that includes a rectangular opening 64. Engaging the surfaces defining rectangular opening 64 is a cam 65 that is attached to a cam shaft 66. Shaft 66 is driven through a bevel gear drive 67 from shaft 40; thus, cam 65 is rotated in response to activation of hand crank 50.

As can be seen in FIG. 4, cam 65 includes a first cutter driving face 65a, a dwell face 56b, and a third face 65c. The dwell face is arcuate with respect to the center of shaft 66 so that when follower 63 is in contact with such dwell face, cutter frame 57 and wires 58 do not move. The rotational position of cam 65 is established with respect to the rotational position of disc 42 such that cam faces 65a and 65c are in contact with follower 63 only when pins 41a and 41b are out of engagement with tooth wheel 39 and cam face 65b is in contact with the cam follower when pins 41a and 41b are in driving contact with the teeth on tooth wheel 39. Thus, cutting takes place only when dough D is not moving with respect to cutting apparatus B. The cam is formed so that a finite dwell period exists to permit relaxation of the dough after a forward thrust and prior to a cut by wires 58; such dwell period assures that the French-fry-cut pieces will have a square cross-section. Cam driving face 65a and face 65c are dimensioned with respect to the space between wires 54 and 58 such that cutting wires 58 move two spaces as the cam is rotated through about 120 degrees. Such mode of operation is desirable to effect complete cutting of the French-fry-cut potato bodies even should wires 58 experience some flexing movement during the cutting step. A more complete understanding of this mode of operation can be gleaned from FIGS. 5a–5e in which individual wires 54 are designated by the letters a, b, c, d, etc., and wherein wires 58 are designated by letters a', b', c', d', etc.

Figures 5A, 5B, 5C, 5D, 5E:
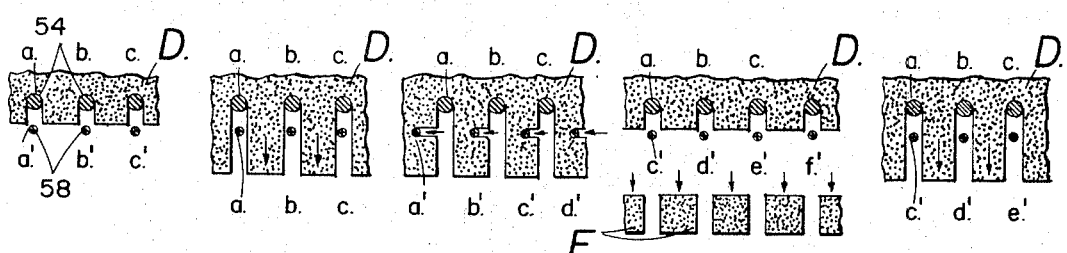
FIGS. 5a–5e are diagrammatic views taken generally along line 5—5 of FIG. 4 and showing the relative position of potato-body-forming wires that constitute part of the present invention.

Referring to FIG. 5a, it will be assumed that pin 41a is engaged with a tooth on toothed wheel 39 so that rotation of disc 42, in response to movement of crank handle 50, will drive plunger 32 downwardly and urge dough D through wires a, b, c, d, etc. Such movement continues until the dough reaches a position shown in FIG. 5b; during the time of such movement between the positions shown in FIG. 5a and the position shown in FIG. 5b, dwell surface 65b is in contact with cam follower 63 so that wires a', b', c', d', etc., remain in registry with respective wires a, b, c, d, etc. When the dough reaches the position shown in FIG. 5b, the apparatus is so arranged that pin 41a terminates its contact with toothed wheel 39, slightly before cam surface 65a contacts cam follower 63. The consequence of such action is shown in FIG. 5c wherein wires a', b', c', d', etc. have moved leftward of their position of registry with wires a, b, c, d, etc. The movement continues until wires 58 reach the positions shown in FIG. 5d which, as can be seen, occurs after each of the cutting wires 58 has moved across two of the spaces between wires 54. Such position completes the formation of French-fry-cut potato bodies, which are indicated at F in FIG. 5d. When the wires are positioned as shown in FIG. 5d, cam 65 resides in the position designated by broken lines in FIG. 4, and cam follower 63 occupies a corresponding position. At such position, pin 41b on disc 42 has rotated into engagement with the next tooth of toothed wheel 39 so that upon downward movement of plunger 32 an additional discharge of dough D occurs. Such further downward movement terminates, as seen in FIG. 5e, and the wires c', d', e' shown in that figure will be returned rightward so as to separate an additional quantity of French-fry-cut potato bodies, because cam surface 65c moves into contact with cam follower 63.

The operation of the apparatus can now be understood by assuming that a bag 19 of dry product has been reconstituted by addition thereto of an appropriate amount of water. The bag is inverted and its mouth or open end is inserted between front plate 25 and rear plate 26 and in alignment with the cutting mechanism B. Plunger 32 and plate 28 are positioned at the upward extreme of their travel. The bottom of bag 19 is engaged in slot 20 and is also engaged in slot 30 whereupon rotation of the hand crank will move plunger 28 downwardly to effect formation of French-fry-cut potato bodies, F, as has been described.

The region between front plate 25 and rear plate 26, through which dough D is caused to move, has approximately 90% open area since wires 54 are of a relatively small diameter. In one satisfactory apparatus designed according to the present invention, the center-to-center space between adjacent wires 54 and wires 58 is $5/16$ of an inch, and the diameter of wires 54 is .042 inch. Such structure provides an open area of approximately 89.5% of the entire area at the outlet of chamber A. As a consequence of such relatively large amounts of open area, the pressure developed at the severed surfaces in response to downward movement of plate 28 and plunger 32 is at a very low magnitude, e.g., 2–2.5 p.s.i. Such low pressure affords the advantages referred to hereinabove. Moreover, the surface area of wires 54 across which the dough moves in passing through the interwire spaces is so small that no significant compaction or cell concentration is caused at the surface of French-fry-cut potato body F; thus the salutary and advantageous results referred to above are achieved. The French-fry-cut potato body so formed is virtually equivalent to similarly shaped raw potato bodies, both before frying and after frying.

It is preferred to embody the present invention in a fully automatic machine, and such machine is shown in FIGS. 7–14. As seen in FIG. 7, the fully automatic apparatus includes a cylindric dough chamber H having at the outlet end thereof a cutting mechanism J toward which dough is moved by a plunger or piston K. As will appear in more detail hereinafter, dry product is stored in a hopper L and is metered by means of a metering apparatus M into chamber H. Means are provided for ading a measured amount of water into the chamber to effect reconstitution of the dry product within the chamber.

The general arrangement of the apparatus of FIG. 7 is such that the functions performed by the apparatus closely parallel those described above with respect to FIGS. 1–6. More specifically, a dough mass D is urged leftward as viewed in FIG. 7 by intermittent movement of plunger K, and cutting mechanism J is timed to separate the dough into French-fry-cut potato bodies. For driving the plunger K, a drive rod 80 is mounted thereto, the drive rod having a gear rack 82 fixed longitudinally thereon. A pinion 84 is enmeshed with rack 82 and is suported on a shaft 85. Shaft 85 is driven by an intermittent drive gear or Geneva drive which includes a notched wheel 86 mounted on shaft 85. The notched wheel is intermittently driven in response to rotation of a disc 87 which has pins 88 and 89 thereon that are received in slots 90 in the periphery of wheel 86. Disc 87 is mounted on a shaft 92 that is driven at a constant speed through a bevel gear drive 93 by a motor 94. As will be explained subsequently, motor 94 is reversible so that plunger K can be driven either toward or away from cutting mechanism J. Connected to shaft 92 through an electromagnetic clutch 95 and a bevel gear drive 96 is a cam 97. Cooperating with the cam 97 is a box cam follower 98 which is connected through a link 99 to cutting mechanism J. Thus, as plunger K is intermittently moved forward, the cutting mechanism separates French-fry-cut potato pieces from the dough mass.

In urging the dough through cutter mechanism J as described next above, plunger K moves from the position shown in solid lines in FIG. 11 to a position designated as $K_1$. When the plunger reaches position $K_1$, motor 94 is caused to reverse so as to retract plunger K to a position designated as $K_2$ (see FIG. 11). As will be explained in more detail subsequently, the linear position of the plunger is manifested electrically by limit switches 102, 103, 104 and 105 which are cam driven by a cam shaft 108; the cam shaft is driven from shaft 92 through a worm and pinion 110. Thus, the rotative position of cam shaft 108 corresponds at all times to the linear position of plunger K. While plunger K is moved toward the position designated as $K_2$, dry product metering apparatus M is caused to deposit a metered volume of dry product in front of the plunger, and while the plunger is moved from the $K_2$ position back to the K position metered water is supplied through a water supply tube 110. Such movement of the plunger consolidates the water and the particles of dry product so that a uniformly dampened mix fills the chamber. When it is subsequently desired to dispense additional French-fry-cut pieces, the plunger is caused to move to the $K_1$ position so that a dough charge D is moved through cutting mechanism J.

In our preferred mode of operation cylinder H can be horizontal or can slope downwardly from horizontal toward cutting mechanism J as shown in FIG. 7. The term "generally horizontal" used hereinafter is intended to encompass both positions of the chamber. As can be seen in FIGS. 12–13 the rearward region of chamber H is provided with an upwardly directed flanged opening 112 for admitting to the cylindric chamber dry product from metering mechanism M and water from water tube 110. For metering the correct amount of water a pressure regulator 113 (see FIG. 11) is provided in the water tube, so that the pressure is maintained constant at all times. A solenoid valve 116 is installed in the water line downstream of pressure regulator 114. Because the pressure in the line is constant and the orifice formed by the tube is fixed, the amount of water discharged through pipe 110 is proportional to the duration of time that solenoid 116 is open. The present invention provides circuitry for opening solenoid valve 116 at the proper time and for a proper duration.

Many dry products, including the one described in more detail in the copending patent application referred to previously, reconstitute more expeditiously with water that is heated to a temperature above ambient. The present invention provides a water heating tank 118 having a cold water inlet line 120 and an electric heating element 122 associated therewith. A conventional thermostat 124 is provided for controlling power to electric heater 122 in such fashion that a satisfactory temperature is maintained within tank 118.

For metering dry material from storage hopper L into cylindric chamber H metering device M is provided with a cylindric housing 126 that has an upper feed opening 128 in product receiving relation to storage hopper L and a discharge opening 130 aligned over flanged opening 112 of the cylindric chamber. Disposed concentrically within housing 126 is a metering hopper 132; the metering hopper resides in the position shown in FIG. 12, dry 126 by means of a shaft 134. The metering hopper is of generally cylindric form and has an opening 136 therein that has a circumferential extent subtending an arc of approximately 90 degrees. Feed opening 128 has a similar circumferential extent so that when the metering hopper resides in the position shown in FIG. 12, dry product from storage hopper L enters through opening 136 in the metering hopper by gravity. Rotation of metering hopper 132 through approximately 180 degrees discharges the contents thereof through discharge opening 132 and flanged opening 112 in cylindric chamber H. For so rotatively driving the metering hopper, a pinion 138 is mounted on shaft 134 exterior of housing 126. In driving relation to pinion 138 is a drive gear 140 that is supported on a countershaft 142. Mounted to shaft 142 is a crank arm 144 that is driven by an operating rod 146. Because drive gear 140 has a diameter twice that of pinion 138 a relatively short amount of movement on rod 146 is sufficient to cause rotation of hopper 132 through 180 degrees.

The opposite end of operating rod 146 is connected to a rocker arm 148 that is pivotally supported by a pin 150. A spring 152 biases operating rod 146 in rightward direction as viewed in FIG. 7. Such position of operating rod 146 corresponds with a closed position of metering rod 132, i.e., a position in which opening 136 resides in an upper position so as to permit filling of the hopper from storage hopper L. Rocker arm 148 has an abutment 152 disposed in the path of plunger drive rod 80 so that when the drive rod is retracting to its rightward extremity as viewed in the drawings, corresponding to the position designated $K_2$ in FIG. 11, metering hopper 132 will rotate so as to dump the contents thereof into cylindric chamber H. As plunger rod 80 moves leftward and away from rocker arm 148, spring 152 effects restoration of the metering hopper and the rocker arm to a normal position.

Figure 11:
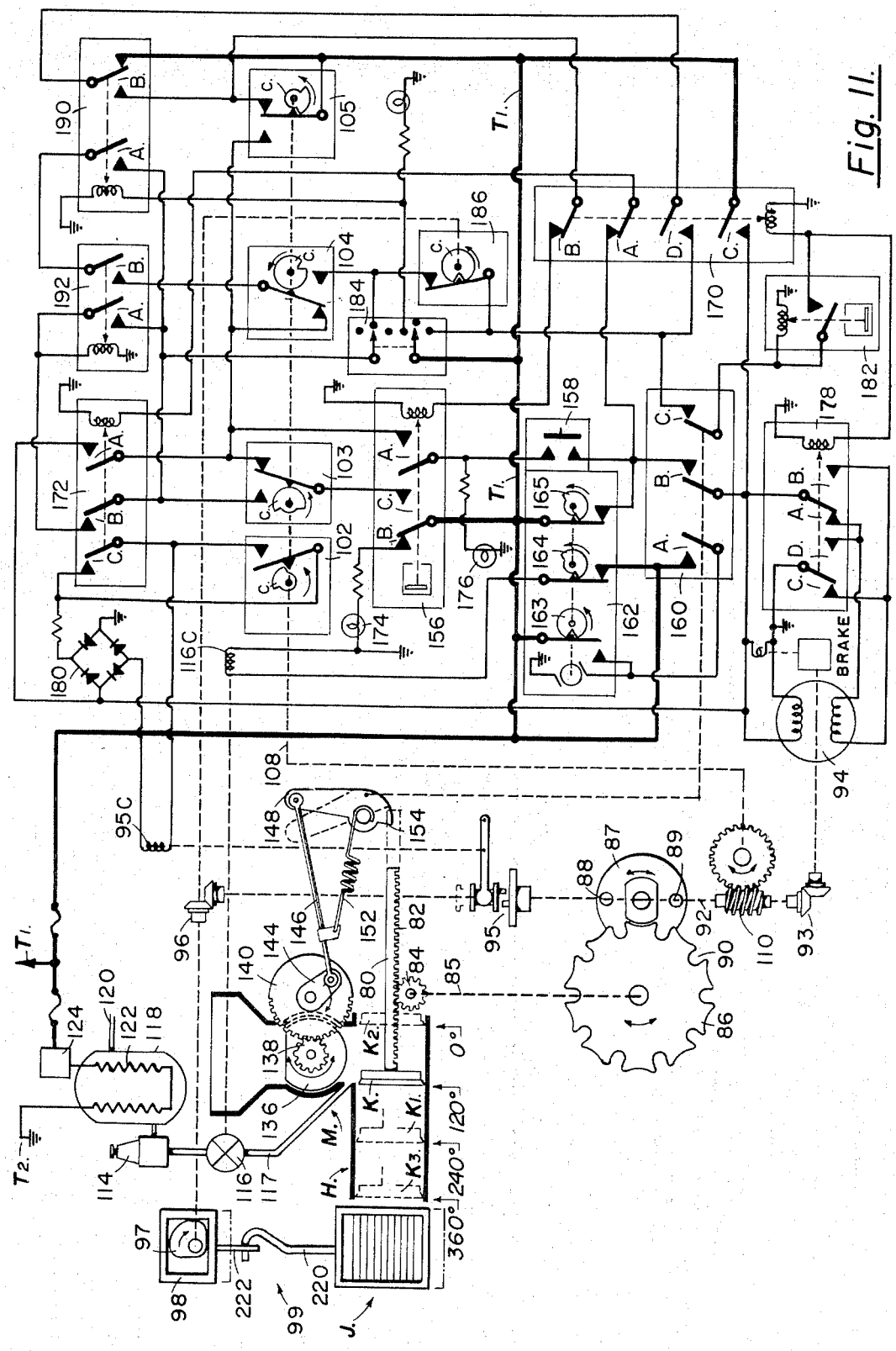
FIG. 11 is a schematic of the control system for the apparatus of FIG. 7.

The volume of metering hopper 132 is established in reference to the volume of cylindric chamber H and the travel of plunger K so that when the plunger moves from the position indicated at $K_2$ in FIG. 11 to the position indicated at K, the dry product will occupy a volume within cylindric chamber H approximately equal to the volume between the plunger and the body of dough remaining in the chamber after a preceding dispensing operation. For adjusting the volume of metering hopper 132 to achieve the proper volume, the metering hopper is provided with an end partition 132P that is adjustably movable along shaft 134 to vary the volume of the metering hopper. When the plunger moves from position $K_1$ to position K, the dry product is consolidated so that it substantially fills the volume in front of the plunger and so that the water substantially totally fills the interstices of the dry product batch. As stated previously, this adjustable chamber volume feature would not be required if the chamber lay in a vertical plane, but in our preferred embodiment, chamber H is substantially horizontal. A brief delay time is necessary to permit reconstitution to occur. A time period of about 1-minute duration, more or less, the specific time being proportional to the nature of the dry product and to the temperature of the water supplied from tank 118, is required for full reconstitution of the dry potato product. Operation of the apparatus before elapse of such time is prevented by a time delay relay 156. Time delay relay 156 includes a contact 156A that establishes a circuit through a start pushbutton 158 only after a sufficient desired time has elapsed. Pushbutton 158 is accessible to the operator of the machine so that after the appropriate time delay afforded by relay 156 depression of the pushbutton will cause dispensing of French-fry-cut pieces by driving plunger K from the K position to the $K_1$ position. During such movement clutch 95 is engaged so that separating or cutting mechanism J operates to form the French-fry-cut potato pieces.

The control apparatus of FIG. 11 functions in accordance with the longitudinal position of plunger K in cylindric chamber H. The linear position of the plunger is converted to a rotational position of shaft 108 by worm and pinion 110. Thus for purposes of verbal description it is convenient to assign to the various positions of the plunger in cylindric chamber H a number from 0 to 360 corresponding to the rotational position of shaft 108. For the purposes of describing the control circuitry the plunger position designated as $K_2$ in FIG. 11 will be considered 0 degrees, the position designated as K will be considered as 120 degrees, the position designated as $K_1$ will be considered 240 degrees, and the position designated as $K_3$ will be considered 360 degrees. In actual practice the rotative position of shaft 108 is slightly less than a full 360 degrees for the total travel of plunger K; such numbers have been adopted for convenience of description only.

Secured to shaft 108 is a cam 102C that operates limit switch 102. Cam 102C is so arranged that the contacts of limit switch 102 are open to permit clutch 95 to be engaged in all positions between 120 degrees and 360 degrees. Thus cutter operation is assured during dispensing of the dough. Also, attached to shaft 108 is a cam 103C that is associated with limit switch 103. The cam is formed so that one set of contacts on limit switch 103 are closed for all positions from 0 degrees to 240 degrees; such contacts permit completion of a circuit path to energize motor 94 in a forward direction, a direction corresponding to leftward movement of plunger K. Contacts 103 serve to terminate motor operation when plunger K has reached the 240 degree position. A cam 104C is also attached to shaft 108 and operates limit switch 104. Cam 104C is so shaped that the contacts of limit switch 104 are retained in a closed position until plunger K reaches the 360 degree position at which the contacts are switched. Finally there is attached to shaft 108 a cam 105C that is associated with limit switch 105. Cam 105C is adapted to close contacts of limit switch 105 during positioning of the plunger between 0 degrees and 120 degrees. A principle function of switch 105 is to arrest forward movement of the plunger when it reaches the 120 degree position when the plunger moves to such position to consolidate the dry product and rehydration water filling the fixed volume of chamber H.

For initiating rehydration of a new batch of dry product a limit switch 160 is provided in association with rocker arm 148. The position of the contact shown in FIG. 11 exists in all positions except when plunger rod 80 has moved to its rightward most extremity at which time rocker arm 148 rocks to close the contacts of the limit switch. Limit switch 160 includes a normally open contact 160A which closes in response to movement of rocker arm 148. Closure of contact 160A connects power from a main line terminal $T_1$ to a synchronous motor constituting a part of a timer 162. The timer includes a shaft on which are mounted timer cams 163, 164 and 165. Cam 163 operates a contact which is connected across limit switch contacts 160A so that, once energized, the timing motor continues to rotate until it has completed a revolution of the cam shaft; the contacts associated with cam 163 open at the completion of a revolution. Cam 164 which is active during about 120 degrees of the rotation of the timer shaft operates a contact which establishes a circuit from line Terminal $T_1$ through a solenoid coil 116C that opens water valve 116. The quantity of water injected through tube 110 into cylindric housing H is proportional to the time that the contact associated with cam 164 is closed. The contacts associated with cam 165 complete a circuit from line terminal $T_1$ through normally closed contacts 170A of a relay 170 to a motor drive relay coil 172. Relay 172 includes a normally open contact 172A which completes a connection from line terminal $T_1$ to motor 94. Power from terminal $T_1$ is connected to the motor through contact 172A and the left-hand contact of limit switch 105, which is closed because plunger K resides between a 0 degree and 120 degree position. In addition to supplying power to motor 94, energization of relay 172 establishes a circuit to the coil of the relay 172 to lock-up the relay through a circuit formed by limit switch contacts 160B, which close shortly after plunger K moves leftward of the 0 degree position, and through relay contacts 170A. Relay 172 remains energized so as to drive motor 94 in a forward direction, until the 120 degree position is reached at which time the lefthand contacts of limit switch 105 open thereby interrupting power to the coil of relay 172.

When the circuit is in the position explained immediately above, the dry product and the water have been consolidated. Simultaneous with the opening of the lefthand contacts of limit switch 105 is closure of the righthand contact of that switch which connects power from terminal $T_1$ through a normally closed contact 170B in relay 170 to the coil of time delay relay 156. Time delay relay 156 is so arranged that the contacts of the relay will not operate until a preselected interval has passed, for example 30 seconds. Such delay affords sufficient time for rehydration of the dry potato product within cylindric chamber H to a firm dough. Time delay relay 156 includes a normally closed contact 156B that establishes a circuit from power terminal $T_1$ to a signal lamp 174; signal lamp 174 apprises the operator that the firm dough is not yet formed and the machine is not ready to dispense French fry-cut potato pieces. When the delay period of relay 156 has passed, the contacts operate so as to close contacts 156A and another set of normally open contacts 156C. Closure of contacts 156C connects power from terminal $T_1$ through the contacts and through the righthand contacts of limit switch 103 and thence through contacts 156A. Such action illuminates a signal lamp 176 which apprises the operator that the machine is ready to dispense and extinguishes light 174. The circuit condition just described also supplies power to one side of pushbutton 158 so that the machine is ready for dispensing upon operation of the pushbutton.

When the operator desires to dispense a quantity of French-fry-cut potato pieces from the apparatus, pushbutton 158 is depressed and the circuit is completed from line terminal $T_1$ to motor 94 through contacts 156C, the right-hand contacts of limit switch 103, relay contacts 156A, pushbutton 158 contacts 160B of limit switch 160 and a contact 178A of a reversing relay 178. Power is also supplied to relay 172 through contacts 170A. Motor 94 drives plunger K in an intermittent fashion from the 120 degree position to the 240 degree position, and cutter mechanism J operates because solenoid coil 95C of clutch 94 is de-energized since both the contact of cam operated limit switch 102 and relay contact 172C are open. This circuit condition interrupts D.C. power from a bridge rectifier 180 that is provided for supplying clutch coil 95C. When plunger K reaches the $K_1$ or 240 degree position, the right-hand contacts of limit switch 103 open so as to interrupt power to motor 94 and to relay 172. Contact 172C closes in response to de-energization of relay 172 so as to complete a circuit to clutch solenoid 95C from D.C. power source 180 thereby disengaging clutch 95 and deactivating cutter mechanism J. The lefthand contacts of limit switch 103 close so as to apply power to a time delay relay 182 that initiates reverse movement of motor 94. Power is supplied to time delay relay 182 from line terminal $T_1$ through contact 156C, the left-hand contact of limit switch 103, a mode switch 184, the contacts of a cam operated limit switch 186, and normally closed contacts 160C of limit switch 160. Mode switch 184 remains in the central position, the position shown in FIG. 11, until it is desired to clean the apparatus.

Limit switch 186 is driven by a cam 186C which revolves with cutter driving cam 97. The cam is so configured that the contacts of limit switch 186 are closed only when the cutting mechanism has reached one extremity of its excursion stroke. Thus, movement of motor 94 is precluded until the cutter returns to an end position. The delay afforded by time delay relay 182 allows sufficient time for all forward movement of motor 94 and plunger K to terminate. When the time delay relay operates, power is supplied through its contacts to the coil of reverse relay 170. Relay 170 includes normally open contacts 170C which supply power to motor 94 so that plunger K is retracted, reverse direction of the motor being effected by operation of reversing relay 178. When relay 170 is energized, contact 170B is interrupted thereby releasing time delay relay 156 and readying it for another cycle of operation. When plunger K reaches its rightward most or 0 degree position, limit switch 160 is operated so as to open contact 160C and interrupt power to relay 182. This releases relay 170 so as to stop motor 94. Opration of limit switch 160 also closes contact 160A to restart timer 162 and cause the apparatus to recycle.

As has been described, in normal operation plunger K moves leftward in cylindric chamber H only to the 240 degree position designated as $K_1$ in FIG. 11. At such position a mass of potato dough remains in the chamber which mass is dispensed on the following cycle of operation; when it is desired to remove all dough from cylindric chamber H, such as might be desirable at the end of a day's operation for example, it is necessary to effect movement of plunger K from the 240 degree position to the 360 degree position. In order to achieve such movement, the moving contacts of mode switch 184 move from the center position shown in FIG. 11 to the upper position. This interrupts the previously described circuit to time delay relay 182 and reversing switch 170 so that when the plunger reaches the 240 degree position it stops rather than reversing its direction of movement. Movement of the lower moving contact of switch 184 to the upper fixed contact connects power terminal $T_1$ to the coil of a relay 190 which causes closure of a normally open contact 190A. Also operated is a relay 192, the coil of which is energized from line terminal $T_1$ through a circuit formed by contacts 156C, the left contact of limit switch 103, and contact 172B. Switch 192 includes a normally open contact 192A that supplies current to the coil thereof through a circuit path in parallel with contact 172B of relay 172. Consequently, when start button 158 is again depressed, power is supplied to the coil of relay 172 through a circuit from line terminal $T_1$ that includes contact 156C, the lefthand contact of limit switch 103, contact 190A, a contact 192B in relay 192, the lefthand contact of limit switch 104, contact 156A, pushbutton 158, and contact 170A. Actuation of relay 172 powers motor 94 in a forward direction so that plunger K moves from the 240 degree position to the 360 degree position, thereby dispensing virtually all of the dough from cylindric chamber H. When the plunger reaches the 360 degree position, cam 104C causes limit switch 104 to close the righthand contact and open the lefthand contact. Opening of the lefthand contact releases relay 172 and stops motor 94. Closure of the righthand contact of limit switch 104 completes a circuit to time delay relay 182 and reversing relay 170 through a path that includes, from line terminal $T_1$, contacts 156C, lefthand contacts of limit switch 103, relay contacts 190A and 192B, the righthand contact of limit switch 104, the contacts of limit switch 186, and contact 160C. Motor 94 is thus driven in a reverse direction and terminates when plunger K reaches the 120 degree position; such termination is effected because at the 120 degree position the righthand contacts of limit switch 105 are opened to disconnect lockup power to relay coil 170 that had been connected thereto through a circuit including the righthand contacts of limit switch 105, a normally open contact 190B in relay 190, a normally open contact 170D in relay 170, contact 160C and the contacts of time delay relay 182.

When it is desired to start the machine up after it has been cleaned, it is necessary first to insert into cylindric chamber H a plug 200 that has approximately the same volume as one charge of dough, i.e., a volume equal to the volume between the 240 degree and the 360 degree position of the plunger. Such plug is shown in FIG. 15. The plug includes a mounting flange 202 for holding it in place and an inner face 204 that resides at the position designated as the 240 degree position in FIG. 11. When the plug is in place in cylindric chamber H, switch 184 is operated so that the moving contacts thereof are in a downward position. Movement of the switch to a downward position connects power from line terminal $T_1$ through the lower moving contacts of the switch and through contact 160C to time delay relay 182. Actuation of time delay relay 182 causes reverse relay 170 to be energized, thereby connecting power to motor 94 so as to drive the motor in a direction to move plunger K rearward or rightward to the zero degree position. When the plunger reaches the rear extremity of its travel, limit switch 160 is operated, breaking the motor circuit by opening contact 160C. Operation of limit switch 160 also closes contact 160A which initiates the operation of timer 162. As described hereinabove, timer 162 causes addition of water to chamber H and movement of plunger K from the zero degree position to the 120 degree position. As a consequence, the dry product and water are consolidated thereby to fill the fixed volume of chamber H. When a time period determined by time delay relay 156 has elapsed, the dough is sufficiently set up to permit removal of plug 200 and restoration of switch 184 to the normal center position, whereupon normal machine operation can be resumed. Alternate procedures can be used when starting with an empty machine. For example, if the cylinder H is in a vertical position, any impervious plate could be inserted between the end of chamber H and cutting mechanism J, after which a fixed volume of dry product and required water could be added to chamber H and allowed to rehydrate to a dough after which the impervious layer would be removed. Plug 200 would not be required in such an application, and after dough formation, chamber H could be used at any angle and normal operation could resume.

Cutting mechanism J is essentially the same as cutting mechanism B just described hereinabove in connection with the embodiment of the invention shown in FIGS. 1–6. Referring to FIGS. 8 and 9, the cutting mechanism includes a rectangular frame 206 that is mounted by hinges 208 to the main frame of the apparatus. A latch 210 retains the opposite side of frame 206 in place in front of cylindric chamber H. Spanning the side members of frame 206 is a set of parallel spaced apart wires 212 that are preferably disposed horizontally and spaced from one another by an amount equal to the width of the desired French-fry-cut pieces, e.g. 5/16 inch. The side members of frame 206 include pins or bars that project inwardly and are spaced from wires 212 by an amount sufficient to support for sliding movement frame 216. Spanning the space between the side members of frame 216 is a second set of wires 218 which are spaced apart from one another by the same distance as the wires 212. Extending upwardly from frame 216 is a hook 220 which is received in a hole in a plate 222 that is fixed to a bracket 224 which projects from cam follower 98. The cam follower is supported for vertical reciprocating movement by means of aligned rods 226 that extend upward and downward therefrom and are supported in anti-friction bushings 228 mounted on the main frame of the apparatus. The shape and mode of operation of cam 97 are identical to cam 65, described hereinabove, and will not be described in detail at this point. Suffice it to say, cam 97 is rotated at all times that solenoid coil 95C is de-energized so as to cause wires 218 to reciprocate relative to wires 212.

Referring to FIG. 10, individual wires 212 are indicated by the lower case letters a, b, c, d, etc., and the individual wires 218 are indicated by lower case letters a', b', c', etc. The wires as seen in FIG. 10A reside in a position corresponding to the position of cam 97 shown in FIG. 8. If it is assumed that cam 97 is being rotatively driven in a clockwise direction as viewed in FIG. 8, the wires will remain in the position shown in FIG. 10A while plunger K moves the mass of dough D toward and through the wires to the position shown in FIG. 10B. When the dough reaches the position shown in FIG. 10B, cam 97 drives cam follower 98 and wires 218 downward. Each of the wires 218 moves across two spaces, and as a consequence French-fry-cut pieces F are separated from the dough mass. As can be seen in FIG. 7 the French-fry-cut pieces, as they fall to a suitable container, tend to separate from one another. In this respect the generally horizontal orientation of chamber H in the embodiment of the invention shown in FIG. 7 is superior to the embodiment of the invention shown in FIG. 1. Subsequent rotation of cam 97 permits wires 218 to remain in alignment with wire 212 so that additional dough can be moved outward of the wires, such condition being shown in FIG. 10D.

On further rotation of cam 97, wires 218 are moved upward so as to form another row of French-fry-cut pieces F. The pieces in such row fall and separate during their downward movement, as described above.

The construction of cutter mechanism J and its manner paratus extremely simple. Hinges 208 preferably include of mounting onto the machine makes cleaning of the apparatus extremely simple. Hinges 208 preferably include a pintle and gudgeon arrangement so that on disengagement of latch 210 frames 206 and 216 can be pivoted outwardly to disengage hook 220 from plate 222 and the frames can then be removed from the machine by upward movement of frame 216. Cylindric chamber H includes a flange 230 which is engaged with alignment studs 232; the cylindric chamber can be removed when cutting mechanism J has been removed by withdrawing the cylindric chamber outwardly along its central axis.

It is desirable to provide a water tight fit between plunger K and the interior wall of cylindric chamber H. Accordingly, plunger K includes a resilient plunger seal indicated in FIG. 12 at 234. Thus when plunger K is moved leftwardly from the 0 degree position to the 120 degree position substantially all water and dry product are consolidated into the chamber to the left of the plunger. When plunger K has moved to the 240 degree position to dispense French-fry-cut potato pieces, reversal of movement of the plunger is resisted by vacuum within the chamber. For breaking this vacuum a valve is provided in the plunger. Resilient seal 234 is fixed to the end of plunger drive rod 80 by means of a slidable collar 236. The collar has one or more elongate slots 238 which cooperate with pins 240 that radiate from the plunger shaft 80, thus forming a sliding connection. The end of plunger shaft 80 is beveled at 242 and the center of seal 234 has a complemental beveled opening 244 which cooperate to form a valve. When plunger rod 80 drives the plunger toward the left as viewed in FIG. 12 the valve is closed; when plunger rod 80 moves the plunger to the right as viewed in FIG. 12 the valve is opened and air is admitted to the left of the plunger.

Means are also provided for permitting escape of air as the plunger moves from the 0 degree position to the 120 degree position during consolidation of the dry product and water. For this purpose an air vent 246 is provided at the upper region of cylindric chamber H adjacent flanged opening 112. The presence of the air vent does not adversely effects machine operation because virtually no pressure is imparted to the dry material and water during movement of the plunger in a consolidated stroke from the 0 degree position to the 120 degree position; rather the materials are only consolidated in the fixed volume of chamber H.

An alternate structure for mountaining cylindric chamber H in the machine is shown in FIG. 14. Depending from the main machine frame 248 is a bracket 250. The bracket 250 includes alignment studs 232 on the front thereof which in combination with cuter frame 206 retain cylindric chamber H in place. This form of construction permits existence of a protective partition 252 between the mechanical parts of the apparatus, which reside above the partition, and the perishable food handling portion of the apparatus, which is located below the partition. Since all other details of the modification shown in FIG. 14 are identical to those in FIG. 7, no detailed explanation will be given.

A modification of the reconstitution chamber is shown in FIGS. 16 and 17; in those figures a chamber H' is shown in a horizontal orientation. The chamber has an upwardly open radially directed inlet opening 112' that is in alignment with a metering chamber and water supply source (not shown) in the form described hereinabove. A plunger K' slides longitudinally in chamber H' and is driven through the operations disclosed above by a plunger drive rod 80'. A dough cutting mechanism J' is supported in alignment with the outlet opening of chamber H'; the operation of cutter J' is as has been explained heretofore.

The dry product and water metering apparatus associated with chamber H' are arranged so as to fill chamber H' only to a level coextensive with a chordal plane below the top of the chamber. Accordingly, an air space 256 is defined within the chamber so that when plunger K' is moved during consolidation of the dry product and water, air trapped in the chamber is vented out the front or outlet opening of chamber H'. At the outlet opening of chamber H' a levelling edge 258 is installed at the level of the chordal planar surface of dough D. Levelling edge 258 is preferably spaced below the upper extremity of chamber H' by an amount equal to the thickness of a French-fry-cut piece, e.g., $5/16$ inch. The body that defines levelling edge 258 tapers upward and rightward as viewed in FIG. 16 to avoid creation of any dough obstruction in chamber H'. The construction shown in FIGS. 16 and 17 efficiently vents air from chamber H' without ejecting water or unformed dough from the machine during consolidation of the dry product and water.

To summarize the operation of the machine, it should be assumed that storage hopper L is filled with dry product, preferably agglomerates of potato particles of approximately $1/8$ inch size having appropriate density and porosity for reconstitution without requiring mechanical mixing. Each time plunger 80 is returned to the rightward most position, metering hopper M dumps a fixed quantity of the dry product into cylindric chamber H. Water is metered through tube 110 into the chamber through flanged opening 112 simultaneous with movement of plunger K from its rightward most position to position heretofore referred to as the K position or the 120 degree position. During such movement of the plunger, the dry product and the water are consolidated so that the water substantially fills the available voids in and between the individual agglomerates in fixed volume chamber H. The completion of rehydration forms uniform dough without the necessity for mixing. Sufficient time to permit dough formation is assured by the presence of time delay relay 156 which precludes dispensing a batch of French-fry-cut potato bodies until dough formation has been completed. When it is desired to dispense the French-fry-cut bodies, pushbutton 158 is depressed by the operator and plunger K moves from the 120 degree position to the 240 degree position thereby moving the previously formed batch of dough through the cutting or separating mechanism J. Such movement is intermittent or stepped so as to afford a quiescent period during which the partially formed cut bodies are separated from the dough mass by transverse movement of wires 218 in a plane adjacent to wires 212. Because the cutting wires 212 occupy an extremely small cross sectional area relative to the cross sectional area of cylindric chamber H, the dough is subjected to but slight pressure during movement of the dough through the wires. Because the French fry bodies are disposed horizontally when they are formed they can fall into a suitable container without significant breakage, since no significant amount of bending of the bodies occurs. Moreover because the French fry bodies are disposed one on top of the other as seen in FIG. 10 they tend to tumble and separate as they fall from the apparatus. As has been explained the machine is automatically controlled and programmed so that the operator need not devote special attention or learning to use of the machine.

Thus it will be seen that the present invention provides a French-fry-cut potato product and a machine and process for making the product that is of a quality for superior to any thing known in the prior art. The French-fry-cut potato piece avoids undesirable characteristics previously assumed to be inherent in French fry pieces formed from dough. Thus for the first time is provided a potot body suitable for French frying that utilizes all the advantages of dehydrated potatoes, such as case of storage and transportation, while achieving the appearance, flavor and consistency of french fries formed from raw potatoes.

Although two embodiments of the invention have been shown and described it will be obvious that other adaptations and modifications can be made without departing from the true spirit and scope of the invention.

What is claimed is:

1. An elongate French-fry-cut potato piece that is formed from homogeneous potato dough consisting essentially of potato solids and water by a process that comprises the steps of providing a set of substantially parallel spaced apart wires that form therebetween spaces having a length corresponding to the longitudinal dimension of the pieces, dividing the dough by moving the dough toward the wires so that portions of the dough pass through spaces betwen the wires and protrude outwardly of the wires by an amount corresponding to the thickness of the pieces, and separating the protruding portions along a plane adjacent to and parallel with the wires.

2. An elongate wire formed French-fry-cut potato piece formed of sliced homogeneous potato dough consisting essentially of potato solids and water, said piece having susbtantially uniform density throughout and being characterized by transversely intersecting surfaces resulting from two-stage wire division at a pressure of about 2 p.s.i.

3. A French fry-size piece of homogeneous potato dough in accordance with claim 2 suitable for frying to produce a blister-free French fry, the four major surfaces of said piece being uncompressed and free of a glazed or trowelled texture.

References Cited

UNITED STATES PATENTS

| 3,344,752 | 10/1967 | Ilines | 99—100 P |
| 2,592,657 | 4/1952 | Cierley | 31—23 |
| 3,468,673 | 9/1969 | Keller | 99—207 |
| 3,282,704 | 11/1966 | Fritzberg | 99—100 P |

NORMAN YUDKOFF, Primary Examiner

C. P. RIBANDO, Assistant Examiner

U.S. Cl. X.R.

426—148, 205